United States Patent Office 3,405,102
Patented Oct. 8, 1968

3,405,102
CURABLE MIXTURES OF CYCLOALIPHATIC POLYEPOXIDES, CURING AGENTS AND ACCELERATORS
Fritz Kugler, Muttenz, and Otto Ernst, Pfeffingen, Basel-Land, Switzerland, assignors to Ciba Limited, Basel, Switzerland, a Swiss company
No Drawing. Filed Oct. 6, 1964, Ser. No. 401,980
Claims priority, application Switzerland, Oct. 8, 1963, 12,342/63
7 Claims. (Cl. 260—78.4)

ABSTRACT OF THE DISCLOSURE

Curable compositions suitable for use in coatings, castings, moldings, adhesives and laminates comprising (a) a cycloaliphatic polyepoxy compound containing at least one 1,2-epoxide group in a six-membered ring, (b) a curing agent for epoxy resins, especially a polycarboxylic acid anhydride, (c) a tin (II) salt of a carboxylic acid or a tin (II) alcoholate or phenolate, and (d) an alkali metal alcoholate.

The combination of tin (II) carboxylates or tin (II) alcoholates or phenolates and alkali metal alcoholates as accelerators for curable systems of polycarboxylic acid anhydrides and cycloaliphatic polyepoxides containing at least one 1,2-epoxide group in a six-membered ring provide curable systems of relatively long shelf-lives and relatively short gelling times.

---

French Patent No. 1,282,227 granted Dec. 11, 1961 to Union Carbide Corporation describes the curing of cycloaliphatic polyepoxides, especially of cycloaliphatic polyepoxy esters such as 6-methyl-3,4-epoxy-cyclohexylcarboxylic acid - (6 - methyl-3,4-epoxy-cyclohexyl)methyl ester, with curing agents, for example polycarboxylic acid anhydrides, in the presence of tin(II)salts of carboxylic acids or tin(II)alcoholates, as curing accelerators. These known curable mixtures have, however, a very short shelf life which is a disadvantage for many technical uses. Furthermore, the cured castings have unsatisfactory mechanical properties.

As curing accelerators for curable systems consisting of cycloaliphatic polyepoxy acetals and polycarboxylic acid anhydrides there have been proposed in French Patent No. 1,270,902 granted July 24, 1961, to Ciba Societe Anonyme alkali metal alcoholates, such as the sodium alcoholate of 2,4-dihydroxy-3-hydroxymethylpentane.

The above-mentioned accelerated systems have a substantially longer shelf life than systems accelerated with tin(II) compounds, such as stannous octoate, but on the other hand their gelling times are likewise considerably longer.

Surprisingly, it has now been found that when using a combination of tin(II)carboxylates or tin(II)alcoholates or phenolates and alkali metal alcoholates as accelerator for curable systems of polycarboxylic acid anhydrides and cycloaliphatic polyepoxides containing at least one 1,2-epoxide group in a six-membered ring, curable systems are obtained that have relatively long shelf-lives and relatively short gelling times. This synergistic behaviour of the two accelerators, which, viewed from the industrial standpoint, is almost ideal, could certainly not have been expected. Rather, it should have been assumed that the addition of an alkali metal alcoholate to tin(II)carboxylate could extend the shelf-life of the mixture, but that this advantage could be achieved only by accepting a proportional extension of the gelling time. Surprisingly, however, the gelling time associated with the combined use of an alkali metal alcoholate and tin(II)carboxylate is as short as when the tin compound by itself is used as accelerator, only the undesirably short shelf life of the curable mixtures containing the tin compound as the only accelerator being extended 3 to 5 times on addition of the alkali metal alcoholate.

Accordingly, the present invention provides curable mixtures suitable for the production of coatings, castings, mouldings and adhesives and for use as interlayer material for the manufacture of laminates, containing
  (a) a cycloaliphatic polyepoxy compound containing at least one 1,2-epoxide group in a six-membered ring,
  (b) a curing agent for epoxy resins, especially a polycarboxylic acid anhydride,
  (c) a tin(II)salt of a carboxylic acid or a tin(II)alcoholate or phenolate, and
  (d) an alkali metal alcoholate.

As cycloaliphatic polyepoxy compounds containing at least one six-membered ring carrying a 1,2-epoxide group there may be mentioned:

limonenedioxide, vinylcyclohexenedioxide, cyclohexyldienedioxide, bis(3,4-epoxycyclohexyl)dimethylmethane;
epoxycyclohexylmethylethers of glycols or hydroxyalkyleneglycols, such as diethyleneglycol-bis(3,4-epoxy-6-methylcyclohexylmethyl) ether;
ethyleneglycol-bis(3-4-epoxycyclohexylmethyl)ether, 1,4-butanediol-bis(3′,4′-epoxycyclohexylmethyl) ether;
(3,4-epoxycycyclohexylmethyl)-glycidylether;
(3,4-epoxycyclohexyl)-glycidylether, ethyleneglycol-bis(2,3-epoxycyclohexyl)ether, 1,4-butanediol-bis(3′,4′-epoxycyclohexyl)ether, p-hydroxyphenyl-dimethyl-methane-bis(3,4-epoxycyclohexyl)ether;
bis(3,4-epoxycyclohexyl)ether;
(3′,4′-epoxycyclohexylmethyl)-3,4-epoxycyclohexylether;
3,4-epoxycyclohexane-1,1-dimethanol-diglycidylether;
epoxycyclohexane-1,2-dicarboximides, such as N,N′-ethylenediamine-bis(4,5-epoxycyclohexane-1,2-dicarboximide);
epoxycyclohexylmethyl-carbamates, such as bis(3,4-epoxycyclohexylmethyl)-1,3-toluylene-dicarbamate;
epoxycyclohexanecarboxylates of aliphatic polyols, such as 3-methyl-1,5-pentanediol-bis(3,4-epoxycyclohexane-carboxylate), 1,5-pentanediol-bis-(3,4-epoxycyclohexane-carboxylate), ethyleneglycol-bis(3,4-epoxycyclohexane-carboxylate),2,2-diethyl-1,3-propanoediol-bis(3,4-epoxy-cyclohexane-carboxylate), 1,6-hexanediol-bis(3,4-epoxycyclohexane-carboxylate), 2-butene-1,4-diol-bis(3,4-epoxycyclohexane-carboxylate), 2-butene-1,4-diol-bis(3,4-epoxy-6-methylcyclohexane-carboxylate), 1,1,1-trimethylolpropane-tris(3,4-epoxy-cyclohexane-carboxylate, 1,2,3-propanetriol-tris(3′,4-epoxycyclohexane-carboxylate);
epoxycyclohexanecarboxylates of hydroxyalkyleneglycols, such as diethyleneglycol-bis(3-4-epoxy-6-methylcyclohexane-carboxylate), triethyleneglycol-bis(3,4-epoxycyclohexanecarboxylate);
epoxycyclohexylalkyldicarboxylic acid esters, such as bis(3,4-epoxycyclohexylmethyl)maleate, bis(3,4-epoxycyclohexylmethyl)oxalate, bis(3,4-epoxy-cyclohexylmethyl)pimelate, bis(3,4-epoxy-6-methylcyclohexylmethyl)succinate, bis(3,4-epoxy-6-methylcyclohexyl-
methyl)adipate, bis(3,4-epoxy-6-methylcyclohexyl-
methyl)sebacate, bis(3,4-epoxycyclohexylmethyl)ter-
ephthalate, bis(3,4-epoxy-6-methylcyclohexylmethyl)
terephthalate;
furthermore especially 3,4-epoxycyclohexanecarboxylates
of 3,4-epoxycyclohexylmethanols, such as (3',4'-epoxy-
cyclohexylmethyl)-3,4-epoxycyclohexane-carboxylate,
(3',4'-epoxy-6'-methylcyclohexylmethyl)-3,4-epoxy-6-
methyl-cyclohexanecarboxylate, (3',4'-epoxy-2'-methyl-
cyclohexylmethyl)-3,4-epoxy-2-methylcyclohexane-
carboxylate, (1'-chloro-3',4'-epoxycyclohexyl)-1-
chloro-3,3-epoxy-cyclohexane-carboxylate, (1'-bromo-
3',4'-epoxy-cyclohexylmethyl)-1-bromo-3,4-epoxy-
cyclohexanecarboxylate;
epoxycyclohexyl-carboxylic acid esters, such as bis(3,4-
epoxycyclohexyl)succinate, bis(3,4-epoxycyclohexyl)
adipate, bis(3,4-epoxycyclohexyl)carbonate, (3,4-
epoxycyclohexyl)-3,4-epoxycyclohexanecarboxylate,
3,4-epoxycyclohexylmethyl-9-10-epoxystearate;
2',2''-sulfonyldiethanol-bis(3,4-epoxycyclohexanecar-
boxylate);
bis(3,4-epoxycyclohexylmethyl)carbonate, bis(3,4-epoxy-
6-methylcyclohexylmethyl)carbonate;
3,4-epoxy-6-methyl-cyclohexanecarboxaldehyde-bis)3,
4-epoxy-6-methylcyclohexylmethyl)-acetal;
bis(3,4-epoxy-cyclohexylmethyl)formal, bis(3,4-epoxy-
6-methyl-cyclohexylmethyl)formal;
benzaldehyde-bis(3,4-epoxycyclohexylmethyl)acetal,
acetaldehyde-bis(3,4-epoxycyclohexylmethyl)acetal,
acetone-bis(3,4-epoxycyclohexylmethyl)ketal, glyoxal-
tetrakis(3,4-epoxycyclohexylmethyl)acetal;
3-(3',4'-epoxycyclohexyl)-9,10-epoxy-2,4-dioxa spiro
(5.5)undecane, 3-(3',4'-epoxy-6-methyl-cyclohexyl)
9,10-epoxy-7-methyl-2,4-dioxaspiro(5.5)undecane;
bis(3,4-epoxyhexahydrobenzal-D-sorbitol;
bis(3,4-epoxyhexahydrobenzal)pentaerythritol (=3,9-
bis-(3,4-epoxycyclohexyl)spirobi(metadioxane)), bis
(3,4-epoxy-6-methyl-hexahydrobenzal)pentaerythritol;
3-(3',4'-epoxycyclohexylmethyloxyethyl-2,4-dioxaspiro-
(5.5)-9,10-epoxyundecane, 3-(3',4'-epoxycyclohexyl-
methyloxy-(2')-propyl)-2,4-dioxaspiro(5.5)-9,10-
epoxyundecane;
3,9-bis(3',4'-epoxycyclohexylmethyloxyethyl)spirobi-
(m-dioxane);
3-(2',3'-epoxypropyloxyethyl)-2,4-dioxaspiro(5.5)-9,
10-epoxyundecanes;
ethyleneglycol-bis-2'(2,4-dioxaspiro[5.5]-9,10-epoxy-
undecyl-3)ethylether, polyethyleneglycol-bis 2'(2,4-
dioxaspiro(5.5)-9,10-epoxyundecyl-3)ethylether,
1,4-butanediol-bis-2'(2,4-dioxaspiro(5.5)-8,10-epoxy-
undecyl-3)ethylether, trans-quinitol-bis-2'(2,4-di-
oxaspiro(5.5)-9,10-epoxyundecyl-2)ethylether, bis
(2,4-dioxaspiro(5.5)-9,10-epoxyundecyl-3)ether, 3,4-
epoxy-hexahydrobenzaldehyde(1'-glycidyloxy-glycerol
2',3')-acetal.

As curing agents for the cycloaliphatic epoxy esters
there may be mentioned, for example, polyfunctional
amines, that is to say amines containing at least two active
hydrogen atoms; polyalcohols, polyphenols, polythiols,
polyisocyanates, polyisothiocyanates, polycarboxylic acids
and especially polycarboxylic acid anhydrides.

As polyfunctional amines there may be mentioned:

methylamine, propylamine, butylamine, isobutylamine,
2-ethylhexylamine;
aniline, ortho-hydroxyaniline, metatoluidine, 2,3-xylidine,
benzylamine, 1-naphthylamine, ortho-, meta- and para-
phenylenediamine;
para,para'-methylenedianiline, cyclohexylamine, cyclo-
pentylamine, para-methane-1,8-diamine;
polyamides (average molecular weight 300 to about
10,000) obtained by condensing a diamine such as
ethylenediamine, diethylenetriamine, triethylene-
tetramine, propylenediamine, with a polycarboxylic
acid such as malonic, succinic, glutaric, adipic acid, or
with a dimerized unsaturated fatty acid such as dilinole-
nic acid;
aliphatic polyamines such as ethylenediamine, propylene-
diamine, butylenediamine, hexylenediamine, octylene-
diamine, nonylenediamine, decylenediamine;
diethylenetriamine, triethylenetetramine, tetraethylene-
pentamine, dipropylenetriamine;
adducts from 1,2-epoxides such as butadiene dioxide,
diglycidyl ethers and especially ethylene oxide or pro-
pylene oxide with a polyalkylenepolyamine or arylene-
polyamine such as ethylenediamine, diethylenetriamine,
triethylenetetramine, phenylenediamine or methylene-
dianiline.

Aminoalcohols such as 2-aminoethanol, 2-aminopropa-
nol, 1,3-diamino-2-propanol; heterocyclic polyamines
such as piperazine, 2,5-dimethylpiperazine, N-(amino-
ethyl)morpholine, N - (aminopropyl)morpholine, mel-
amine, 2,4-diamino-6-(aminoethyl)pyrimidine, dimethyl-
urea, guanidine, para,para'-sulfonyldianiline or 3,9-
bis(aminoethyl)spirobimetadioxane.

The polyfunctional amines are generally used in an
amount such that the curable mixture contains for every
equivalent of epoxide groups of the cycloaliphatic poly-
epoxy ester from 0.2 to 5.0, preferably from 0.3 to 3.0
active amine hydrogen atoms.

As polyalcohols and polyphenols there may be men-
tioned: ethyleneglycol, diethyleneglycol, polyethylenegly-
cols, dipropyleneglycol, polypropyleneglycols, trimethyl-
eneglycol, butanediols, pentanediols, 12,13-tetracosane-
diol, glycerol, polyglycerols, pentaerythritol, sorbitol, poly-
vinyl alcohols, cyclohexanediols, inositol; dihydroxy-
toluenes, resorcinol, pyrocatechol, bis(4-hydroxyphenyl)
dimethylmethane and bis(4-hydroxyphenyl)methane, as
well as adducts of ethylene oxide or propylene oxide with
such phenols.

The polyols are generally used in an amount such that
the mixture contains for every equivalent of epoxide
groups of the cycloaliphatic polyepoxy ester from 0.1 to
2.0, preferably from 0.2 to 1.5, hydroxyl groups.

As polycarboxylic acids the following may be men-
tioned: oxalic, malonic, succinic, glutaric, adipic, pimelic,
suberic, azelaic, sebacic acid, alkylsuccinic and alkenyl-
succinic acids, maleic, fumaric, itaconic, citraconic,
mesaconic, ethylidenemalonic, isopropylidenemalonic, al-
lylmalonic muconic, diglycollic, dithioglycollic, 1,2-
cyclohexanedicarboxylic, 1,4 - cyclohexanedicarboxylic,
phthalic, isophthalic, terephthalic, tetrahydrophthalic,
tetrachlorophthalic, 1,8 - naphthalenedicarboxylic, 1,2-
naphthalenedicarboxylic, 3-carboxycinnamic, 2-carboxy-
2-methylcyclohexane - acetic, 1,1,5 - pentatricarboxylic,
1,2,4 - hexanetricarboxylic, 5 - octene - 3,3,6 - tricarbox-
ylic, 1,2,3 - propanetricarboxylic, 1,2,4 - benzenetricar-
boxylic, 1,3,5 - benzenetricarboxylic, 3 - hexene - 2,2,3,4-
tetracarboxylic, 1,2,3,4 - benzenetetracarboxylic, 1,2,3,5-
benzenetetracarboxylic, pyromellitic, benzenepentacar-
boxylic, mellitic acid; dimerized and polymerized, unsat-
urated fatty acids, such as dimerized linseed oil fatty acid,
tung oil fatty acid or soybean fatty acid, having an aver-
age molecular weight from 500 to 5000; furthermore,
the polycarboxypolyesters, containing at least two car-
boxyl groups per molecule, obtained by condensing a poly-
alcohol such as ethyleneglycol, diethyleneglycol, propyl-
eneglycol, 1,4-butanediol, 1,6-hexanediol, glycerol, tri-
methylolpropane or pentaerythritol with an excess of the
polycarboxylic acids mentioned above.

In general, the polycarboxylic acids are used in an
amount such that the curable mixture contains for every
equivalent of epoxide groups of the cycloaliphatic poly-
epoxy ester from 0.3 to 1.25, preferably from 0.3 to 1.0,
carboxyl groups.

As polycarboxylic acid anhydrides preferably used in
the curable mixtures of this invention there may be men-
tioned the anhydrides of the following acids: Succinic,
glutaric, propylsuccinic, methylbutylsuccinic, hexylsuccinic, heptylsuccinic, allylsuccinic, pentenylsuccinic, octenylsuccinic, nonenylsuccinic, α,β - diethylsuccinic, maleic, chloromaleic, dichloromaleic, itaconic, citraconic, hexahydrophthalic, tetrahydrophthalic, methyltetrahydrophthalic, tetrachlorophthalic, hexachloro - endo - methylene tetrahydrophthalic (chlorendic), tetrabromophthalic, tetraiodophthalic, 4 - nitrophthalic, 1,2 - naphthalenedicarboxylic acid; polymeric polycarboxylic acid anhydrides obtained by autocondensation of dicarboxylic acids, such as adipic, pimelic, sebacic, terephthalic or isophthalic acid.

Furthermore anhydrides of the Diels-Alder adducts of maleic acid with alicyclic compounds containing conjugated double bonds, for example bicyclo(2.2.1)heptene-2,3-dicarboxylic acid anhydride (nadic anhydride), methylbicyclo(2.2.1)heptene-2,3-dicarboxylic acid anhydride (methylnadic anhydride) and allylbicyclo(2.2.1)heptene-2,3-dicarboxylic acid anhydride.

In general the polycarboxylic acid anhydrides are used as curing agents in an amount such that the curable mixture contains for every equivalent of epoxide groups of the cycloaliphatic polyepoxy ester from 0.1 to 1.5, preferably from 0.2 to 1.0, equivalent of anhydride groups.

The tin(II)carboxylates or tin(II)octoates used according to the invention as accelerator (c) are contained in the curable mixtures advantageously in an amount from 0.001 to 20% by weight, preferably from 0.1 to 10% by weight, referred to the total weight of the ingredients (a) to (d) of the mixture.

As suitable stannous salts of carboxylic acids there may be mentioned: Stannous acetate, propionate, oxalate, tartrate, butyrate, valerate, caproate, caprylate, n-octoate, 2-ethylhexoate, laurate, palmitate, stearate and oleate.

Particularly suitable stannous alcoholates or phenolates are those of the formula $Sn(OR)_2$, where R represents a monovalent, saturated or unsaturated, linear or branched hydrocarbon radical containing 1 to 18, preferably 3 to 12, carbon atoms, for example: Stannous methylate, isopropylate, butylate, tertiary butylate, 2-ethylhexylate, tridecanolate, heptadecanolate, phenolate and ortho-, meta- and para-cresolate.

The alkali metal alcoholates (d) used according to this invention as accelerators are advantageously added to the curable mixture in an amount from 0.001 to 20% preferably 0.1 to 10%, by weight, referred to the total weight of the ingredients (a) to (d) of the mixture. There are particularly suitable potassium and sodium alcoholates, soluble in the polyepoxy ester, of monoalcohols such as methanol, ethanol, isopropanol, n-butanol, tertiary butanol, 2-ethylhexanol, tridecanol, heptadecanol, or of polyalcohols such as ethyleneglycol, diethyleneglycol, triethyleneglycol, propanediols, butanediols, 1,2,6-hexanetriol or 3-hydroxymethyl-2,4-dihydroxypentane.

The invention includes also a process for curing cycloaliphatic polyepoxy ester compounds containing at least one 1,2-epoxide group in a six-membered ring, with curing agents, especially polycarboxylic acid anhydrides, preferably at an elevated temperature, wherein the curing accelerator used is a stannous salt of a carboxylic acid or a stannous alcoholate or phenolate, in conjunction with an alkali metal alcoholate.

The term "curing" as used in this context signifies the cross-linking of the polyepoxy ester with the polyfunctional curing agent to form insoluble and infusible resins having good mechanical properties. In certain cases curing may be achieved by simply mixing the epoxy compound with the curing agent and the accelerator at room temperature or a moderately raised temperature. In general—more especially when polycarboxylic acid anhydrides are used as curing agents—curing is performed at an elevated temperature ranging, for example, from 120° to 160° C. According to a preferred variant of the present curing process there is first prepared a curable two-component system in which component (1) is a stable, storable mixture of a cycloaliphatic polyepoxy compound containing at least one 1,2-epoxide group in a six-membered ring, a stannous salt of a carboxylic acid or a stannous alcoholate or phenolate and an alkali metal alcoholate, whereas component (2) contains the curing agent. Such a two-component system can be marketed as a product that is practically indefinitely storable at normal room temperature and can be converted by the user by simple mixing or fusing of the two components into the finished casting resin, laminating resin, coating composition, adhesive or plastic foam.

The curable mixtures of the cycloaliphatic polyepoxide with the curing agent and the accelerator, or the curable two-component system, may be further admixed at any stage prior to curing with fillers, plasticisers, pigments, dyestuffs, flame-inhibitors and mould lubricants. Suitable extenders and fillers are, for example, rutile, mica, quartz meal, rock meal, alumina trihydrate, calcium carbonate, ground dolomite, gypsum or barium sulfate.

To improve the mechanical properties there may be further added fibres or fabrics of glass, polyesters, nylon polyacrylonitrile, silk or cotton.

Furthermore, for the manufacture of plastic foams there may be added the usual propellants, for example compounds that give off carbon dioxide or nitrogen under the curing conditions, and/or low-boiling inert organic liquids, such as trichlorofluoromethane.

The curable mixtures of this invention may be used without or with fillers, if desired in the form of solutions or emulsions, as laminating resins, paints, lacquers, dipping resins, casting resins, coating compositions, pore fillers, putties, adhesives, moulding compositions, plastic foams and insulating compounds for the electrical industry, as well as for the manufacture of such products.

Percentages in the following examples are by weight.

Example 1

In the experiment 1 a mixture is prepared from 1 kg. of 3-(3′,4′(-epoxycyclohexyl) - 9,10 - epoxy - 2,4-dioxaspiro (5.5) undecane of the formula

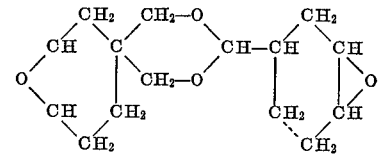

(Compound A) containing 6.28 epoxide equivalents per kg., 120 g. of an alcoholate prepared by reacting 8.2 g. of sodium with 1 kg. of 3-hydroxymethyl-2,4-dihydroxypentane (Compound B), 30 g. of stannous 2-ethylhexoate and 950 g. of hexahydrophthalic anhydride;

In experiment 2 a mixture is prepared from 1 kg. of Compound A, 120 g. of Compound B and 950 g. of hexahydrophthalic anhydride;

In experiment 3 a mixture is prepared from 1 kg. of Compound A, 30 g. of stannous 2-ethylhexoate and 550 g. of hexahydrophthalic anhydride, and In experiment 4 1 kg. of Compound A, 30 parts of stannous 2-ethylhexoate and 950 g. of hexahydrophthalic anhydride are mixed.

One part of each mixture was used to measure the shelf life at 80° C., that is to say the time taken by the viscosity of the resin+curing agent mixture to rise to 1500 centipoises (isothermic).

Another part of each mixture was used to measure the gelling time of a layer 3 mm. thick at 120° C. 800 g. of each mixture was poured into round tinplate cans of 10 cm. diameter and cured in an oven at 80° C. The maximum temperature (exothermic reaction) was measured and the appearance of the castings accessed.

The remainder of each of the four mixtures was poured at 80° C. into aluminum moulds (40 x 10 x 140 mm.) and cured for 30 minutes at 120° C. The resulting castings were then examined for the mechanical strength properties:

|  | Test 1 | Test 2 | Test 3 | Test 4 |
|---|---|---|---|---|
| 3-(3',4'-epoxycyclohexyl)-9,10-epoxy-2,4-dioxaspiro(5.5)-undecane (Compound A), grams | 1,000 | 1,000 | 1,000 | 1,000 |
| Sodium alcoholate (Compound B), grams | 120 | 120 | | |
| Stannous 2-ethylhexoate, grams | 30 | | 30 | 30 |
| Hexahydrophthalic anhydride, grams | 950 | 950 | 550 | 950 |
| Initial viscosity of the resin+curing agent mixture at 25° C., centipoises | 1,060 | 1,460 | 3,560 | 1,280 |
| Shelf life at 80° C. (up to 1,500 centipoises), minutes | 49 | 64 | 10 | 15 |
| Gelling time of a 3 mm.-thick specimen, mins | 7 | 16 | 6 | 8 |
| Heat distortion point according to Martens (DIN), ° C | 174 | 178 | 160 | 61 |
| Flexural strength, kg./mm.² | 6.6 | 7.5 | 6.8 | 8.0 |
| Impact strength, cmkg./cm.² | 5.0 | 7.5 | 5.0 | 1.7 |
| Exothermic reaction, maximum temperature (800 g.), ° C | 255 | 248 | 254 | |
| Appearance of castings | (¹) | (²) | (³) | |

¹ Good, slightly dark color.
² Good, bright.
³ Black decomposed.

Compared with the known mixture 2, the mixture 1 of the invention gelled more quickly at 120° C. (120° C. is as a rule tolerated by the electrical industry as the maximum curing temperature. Higher curing temperatures are often inadmissible [paper coil formers etc.]). This enables earlier removal from the mould and this is of considerable significance to the improved economy of the manufacturing process.

Compared with the known mixtures 3 and 4, specimen 1 of the invention offers the important advantage of a longer shelf life at 80° C. By virtue of its higher content of anhydride the specimen 1 of the invention has a substantially lower viscosity than specimen 3, which is of great importance to impregnating resins and, on the other hand, owing to the greater stretchability and improved economy also to casting resins. Furthermore, the heating up of the material due to the exothermic curing reaction is withstood by the mixture of the invention without damage, whereas specimen 3 displays under identical conditions considerable signs of decomposition (blistering, charring). The cured specimen 4, compared with specimen 1 cured according to this invention, has the disadvantage of a very poor heat distortion behaviour, which cannot be significantly improved even by further tempering at 120° C. for several hours.

Example 2

In experiment 1 a mixture was prepared from 1 kg. of 6-methyl-3,4-epoxycyclohexylcarboxylic acid(6-methyl-3,4-epoxycyclohexyl)methyl ester (Compound C), known by its registered trade mark "Unox 201," 120 g. of Compound B (see Example 1), 30 g. of stannous (2-ethylhexylate) and 950 g. of hexahydrophthalic anhydride;

In experiment 2, 1 kg. of Compound C was mixed with 120 g. of Compound B and 950 g. of hexahydrophthalic anhydride, and In experiment 3, 1 kg. of Compound C was mixed with 30 g. of stannous (2-ethylhexylate) and 950 g. of hexahydrophthalic anhydride.

One part of each mixture was used to measure the gelling time of a 3 mm. thick layer at 120° C. Another portion of each mixture was used to measure the shelf life at 80° C. The remainder was poured into aluminum moulds (40 x 10 x 140 mm.) and cured for 30 minutes at 120° C.

Specimen 1 of the invention (see the following table) offers over specimen 2 the advantage of a substantially shorter gelling time. Compared with the likewise known mixture 3, specimen 1 of the invention has the advantage that its curing takes much less time, which finds its expression in the heat distortion point according to Martens (DIN).

|  | Test 1 | Test 2 | Test 3 |
|---|---|---|---|
| 6-methyl-3,4-epoxycyclohexyl-carboxylic acid (6-methyl-3,4-epoxycyclohexyl)methyl ester, grams | 1,000 | 1,000 | 1,000 |
| Sodium alcoholate (Compound B), grams | 120 | 120 | |
| Stannous 2-ethylhexylate, grams | 30 | | 30 |
| Hexahydrophthalic anhydride, grams | 950 | 950 | 950 |
| Shelf life at 80° C. (up to 1,500 centipoises) minutes | 84 | 103 | 37 |
| Gelling time of a 3 mm.-thick specimen at 120° C., minutes | 8 | 20 | 9 |
| Heat distortion point according to Martens (DIN), ° C | 117 | 143 | 35 |
| Flexural strength, kg./cm.² | 4.4 | 5.9 | 3.7 |
| Impact strength, cmkg./cm.² | 3.5 | 5.2 | 0.8 |

What is claimed is:
1. A curable composition of matter comprising
   (a) a cycloaliphatic polyepoxy compound containing at least one 1,2-epoxide group in a six-membered carbocyclic ring,
   (b) a polycarboxylic acid anhydride curing agent for epoxy resins,
   (c) a member selected from the group consisting of a stannous salt of aliphatic monocarboxylic acids and aliphatic dicarboxylic acids with 2 to 18 carbon atoms, a stannous alcoholate derived from a monoalcohol with 1 to 18 carbon atoms and a stannous phenolate, and
   (d) an alkali metal alcoholate.

2. A curable composition as claimed in claim 1, containing the polycarboxylic acid anhydride in an amount such that the mixture contains for every equivalent of epoxide groups of the cycloaliphatic polyepoxy compound 0.2 to 1.0 equivalent of anhydride groups.

3. A curable composition as claimed in claim 1, containing as component (c) stannous (2-ethylhexoate).

4. A curable composition as claimed in claim 1, containing as component (c) stannous (2-ethylhexylate).

5. A curable composition as claimed in claim 1, containing the component (c) in an amount of 0.1 to 10% by weight, referred to the total weight of the components (a) to (d) of the mixture.

6. A curable composition as claimed in claim 1, containing as component (d) a member selected from the group consisting of sodium alcoholate of 1,2,6-hexanetriol and sodium alcoholate of 3-hydroxymethyl-2,4-dihydroxypentane.

7. A curable composition as claimed in claim 1, containing the alkali metal alcoholate (d) in an amount of 0.1 to 10% by weight, referred to the total weight of the components (a) to (d) of the mixture.

References Cited

UNITED STATES PATENTS

| 3,080,341 | 3/1963 | Chenicek. |
| 2,976,678 | 10/1934 | Wittner et al. |
| 3,117,099 | 1/1964 | Proops et al. |
| 3,244,670 | 4/1966 | Puchala et al. |

WILLIAM H. SHORT, Primary Examiner.

T. E. PERTILLA, Assistant Examiner.